United States Patent
Currey et al.

(10) Patent No.: US 12,084,261 B1
(45) Date of Patent: Sep. 10, 2024

(54) PIPE NIPPLE INSERT AND DIP TUBE

(71) Applicant: Mercury Plastics LLC, Middlefield, OH (US)

(72) Inventors: Donald Currey, Chagrin Falls, OH (US); Scott Raymond Gardner, Chagrin Falls, OH (US); Michael Lenk, Middlefield, OH (US)

(73) Assignee: Mercury Plastics LLC, Middlefield, OH (US)

( * ) Notice: Subject to any disclaimer, the term of this patent is extended or adjusted under 35 U.S.C. 154(b) by 1128 days.

(21) Appl. No.: 15/931,103

(22) Filed: May 13, 2020

Related U.S. Application Data

(60) Provisional application No. 62/846,984, filed on May 13, 2019.

(51) Int. Cl.
| | |
|---|---|
| *B65D 83/32* | (2006.01) |
| *B05B 15/30* | (2018.01) |
| *F16L 13/14* | (2006.01) |
| *F16L 59/02* | (2006.01) |
| *F24H 9/13* | (2022.01) |
| *F24H 9/45* | (2022.01) |

(52) U.S. Cl.
CPC .............. *B65D 83/32* (2013.01); *B05B 15/30* (2018.02); *F16L 13/14* (2013.01); *F16L 59/021* (2013.01); *F24H 9/136* (2022.01); *F24H 9/45* (2022.01)

(58) Field of Classification Search
CPC ......... B05B 15/30; B65D 83/32; F24H 9/136; F16L 59/021
See application file for complete search history.

(56) References Cited

U.S. PATENT DOCUMENTS

| | | |
|---|---|---|
| 2,123,809 A | 7/1938 | Clinton |
| 2,602,465 A | 7/1952 | Goehring |
| 2,764,427 A | 9/1956 | Andrus |
| 3,082,024 A | 3/1963 | Boylan |
| 3,726,475 A | 4/1973 | Eising |
| 3,776,456 A | 12/1973 | Eising |
| 4,964,394 A | 10/1990 | Threatt |
| 5,277,171 A | 1/1994 | Lannes |
| 5,988,117 A | 11/1999 | Lannes |
| 6,138,614 A | 10/2000 | Shropshire et al. |
| 6,269,780 B1 | 8/2001 | Hughes |
| 6,745,723 B1 | 6/2004 | Hicks et al. |
| 7,093,565 B2 | 8/2006 | Robison |
| 7,203,418 B1 | 4/2007 | York et al. |
| 7,766,043 B2 | 8/2010 | Thomas et al. |
| 7,819,137 B2 | 10/2010 | Nelson et al. |
| 7,850,898 B1 | 12/2010 | Rowley et al. |

(Continued)

*Primary Examiner* — Atif H Chaudry
(74) *Attorney, Agent, or Firm* — Bose McKinney & Evans LLP

(57) ABSTRACT

A pipe nipple insert and dip tube for use with a water heater having a pipe nipple, the dip tube including a pipe nipple insert and a tubular body. The pipe nipple insert includes an outer wall and a plurality of annular crush rings extending radially from the outer wall. An overlapping connection is included at a bottom of the pipe nipple insert and a top of the tubular body for connecting the bottom of the pipe nipple insert to the top of the tubular body, wherein either the bottom of the pipe nipple insert overlaps the top of the tubular body or the top of the tubular body overlaps the bottom of the pipe nipple insert.

11 Claims, 14 Drawing Sheets

(56) References Cited

U.S. PATENT DOCUMENTS

| | | |
|---|---|---|
| 7,861,678 B2 | 1/2011 | McClellan |
| 7,891,382 B2 | 2/2011 | Rushlander et al. |
| 7,927,534 B1 | 4/2011 | Seman, Sr. et al. |
| 8,220,126 B1 | 7/2012 | Yunk et al. |
| 8,277,714 B1 | 10/2012 | Blue et al. |
| 8,329,088 B1 | 12/2012 | Rowley et al. |
| 8,337,738 B1 | 12/2012 | Seman, Sr. et al. |
| 8,343,407 B1 | 1/2013 | Seman, Sr. et al. |
| 8,365,770 B2 | 2/2013 | Thomas et al. |
| 8,431,067 B2 | 4/2013 | Rowley et al. |
| 8,454,874 B2 | 6/2013 | Rushlander et al. |
| 8,646,476 B2 | 2/2014 | Thomas et al. |
| 8,789,854 B2 | 7/2014 | Christian, Jr. et al. |
| 8,865,051 B1 | 10/2014 | Rowley |
| 2005/0139171 A1 | 6/2005 | Robison |
| 2005/0263190 A1* | 12/2005 | Hammond ............ F16K 15/035 137/512 |
| 2011/0247572 A1* | 10/2011 | Smith ..................... F24H 1/205 122/19.1 |

* cited by examiner

PIPE NIPPLE INSERT AND DIP TUBE

CROSS-REFERENCE TO RELATED APPLICATIONS

This application claims the benefit of U.S. Provisional Patent Application No. 62/846,984, filed May 13, 2019 with the United States Patent and Trademark Office, which is hereby incorporated by reference.

BACKGROUND AND SUMMARY OF THE INVENTION

It is known to provide a dip tube in a water heater to supply cold water to the tank. The cold water is injected at the bottom of the tank through the dip tube. The cold water is then heated where it rises in the water heater and is drawn off by a hot water discharge pipe. A pipe nipple connects to the water heater, the water heater being made from steel, and allows plumbing for the cold water inlet to be connected to the water heater. The pipe nipple is threaded on both ends and is typically made of brass, galvanized steel, or galvanized steel with a dielectric insert.

Although the exterior of galvanized nipples are dielectrically compatible with the steel water heater, the interior of the galvanized nipple is not. With the interior unprotected, the galvanized nipple corrodes, clogs, rusts and eventually leaks. Brass nipples, on the other hand internally will not corrode like galvanized nipples, but the introduction of brass to the steel water heater is not a dielectrically correct connection. Left unprotected, the area of the steel water heater below the brass nipple corrodes. Therefore, a dielectric connection is desired because it prevents electrolysis with the connecting plumbing and the steel water heater.

To combat the corrosion issue and provide a dielectric connection, water heater manufacturers are now supplying plastic lined galvanized nipples with new water heaters. This plastic liner in the galvanized nipple is also known as the dielectric liner. These plastic lined galvanized nipples are sometimes referred to as dielectric nipples. The dielectric nipples and the brass nipples cost more than the galvanized steel nipples.

It is also known to use heat traps to minimize convective heat loss in water heaters. Heat traps are used to minimize the flow of heat from the heated water in the tank through the cold water inlet and hot water outlet openings and to the piping connected thereto. Various convective heat trap devices have been previously proposed for connection to a water heater tank at or near an inlet or outlet opening. These heat trap devices are basically check valve type structures which freely permit water to flow through the tank inlet and outlet in operational directions during water supply periods, but substantially inhibit convective water outflow through the inlet and outlet during non-demand storage periods of the water heater.

As noted above, the pipe nipple is threaded on both ends, where one threaded end connects to the water heater via a coupling and the other threaded end connects to the plumbing. The dip tube is often located below the threaded end of the pipe nipple that connects to the water heater. The dip tube typically rests within the coupling but requires a gasket and a dip tube cup to retain the dip tube therein. The dip tube, the dielectric liner, the gasket, the heat trap and the dip tube cup are often separate components that must be assembled or disassembled during installation and/or service of the water heater. This results in increased amounts of labor for verification of both the proper assembly and efficient functionality of each separate component. This increased labor results in increased costs for the manufacturer and servicemen which are typically passed on to the consumer. Moreover, improper installation of these separate components can result in leaks, which may form between the dip tube, heat trap, and the pipe nipple.

As a result of the above, there is a need to reduce the labor and costs associated with the assembly and repair of dip tubes and heat traps and to provide leak free and assemblies and connections to pipe nipples.

What is disclosed is a dip tube for use with a water heater, the dip tube comprising: a pipe nipple insert having a pipe nipple longitudinal axis and a tubular body having a tubular longitudinal axis. The pipe nipple longitudinal axis is coaxial with the tubular longitudinal axis and the pipe nipple insert is located above the tubular body. The pipe nipple insert has an outer wall including a plurality of annular crush rings extending radially from the outer wall. The plurality of annular crush rings may be substantially perpendicular to the longitudinal axis of the pipe nipple insert. There is also an overlapping connection at a bottom of the pipe nipple insert and a top of the tubular body for connecting the bottom of the pipe nipple insert to the top of the tubular body, wherein either the bottom of the pipe nipple insert overlaps the top of the tubular body or the top of the tubular body overlaps the bottom of the pipe nipple insert. The connection can be effectuated through any known mechanical attachment, one example of a contemplated mechanical attachment comprises at least one tab lock extending from the outer wall of the pipe nipple insert and a corresponding hole in the tubular body.

The dip tube may further comprise a heat trap assembly integral with the pipe nipple insert and located below the plurality of annular crush rings. Wherein, the heat trap assembly may further comprise at least one annular groove located on the outer wall of the pipe nipple insert and having a circumferential slot, and at least one heat trap. The at least one heat trap further comprising an inner portion, an outer ring portion, and a connecting portion, connecting the outer ring portion to the inner portion. When installed in the heat trap assembly the heat trap is oriented such that the outer ring portion is located within the at least one annular grove and the inner portion extends through the circumferential slot and is located within the outer wall of the pipe nipple. Further, in embodiments where the tubular body overlaps the heat trap assembly, the tubular body also serves to help retain the at least one heat trap in the at least one annular groove. The heat trap assembly may further comprise a plurality of support ribs extending axially in the direction of the pipe nipple longitudinal axis.

It is contemplated that the described dip tube may be used without a gasket and/or a retraining cup. Further, in addition to known multi-part constructions the pipe nipple insert may be one-piece or monolithic in its construction.

This application further discloses a pipe nipple insert for use in a water heater, the pipe nipple insert comprising: a pipe nipple insert having a longitudinal axis and an outer wall, a plurality of annular crush rings extending radially from the outer wall, a pipe nipple section configured to engage a pipe nipple, and a tubular engaging section configured to engage a tubular body or dip tube. The annular crush rings may be substantially perpendicular to the longitudinal axis of the pipe nipple insert. The pipe nipple insert may further include a mechanical attachment configured to engage a corresponding hole in a tubular body or dip tube. One example of a contemplated mechanical attachment comprises at least one tab lock extending from the outer wall of the pipe nipple insert and a corresponding hole in the tubular body or dip tube. In addition to known multi-part constructions the pipe nipple insert may be one-piece or monolithic in its construction.

The pipe nipple insert may further comprise a heat trap assembly integral with the pipe nipple insert and located below the plurality of annular crush rings. Wherein, the heat trap assembly may further comprise at least one annular groove located on the outer wall of the pipe nipple insert and having a circumferential slot, and at least one heat trap. The at least one heat trap further comprising an inner portion, an outer ring portion, and a connecting portion, connecting the outer ring portion to the inner portion. When installed in the heat trap assembly the heat trap is oriented such that the outer ring portion is located within the at least one annular grove and the inner portion extends through the circumferential slot and is located within the outer wall of the pipe nipple. In some embodiments the heat trap assembly may be included in the pipe nipple section, in other embodiments the heat trap assembly may be included in the tubular engaging section. The heat trap assembly may further include a plurality of support ribs extending axially in the direction of the pipe nipple longitudinal axis.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Figure 1:
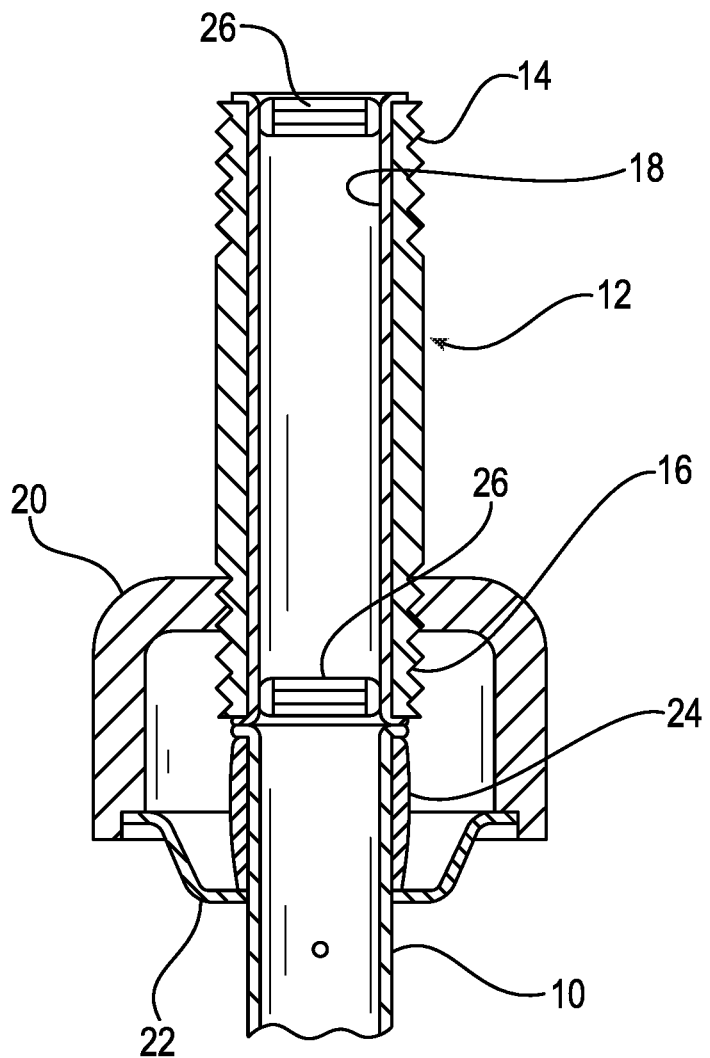
FIG. 1 is a cross-sectional view of a dip tube connected to a nipple of a water heater according to the prior art.

Various embodiments of the invention described herein provide a leak free pipe nipple insert that replaces multiple separate components including a dielectric liner, heat trap assemblies, a gasket and a dip tube cup or retaining cup for a water heater. The pipe nipple insert may be monolithic or a one-piece construction.

As noted above, there are a number of separate components with respect to installation, repair and replacement of a dip tube for a water heater. By example, FIG. 1 displays a cross-sectional view of a dip tube 10 connected to a nipple 12 of a water heater according to the prior art. Nipple 12 includes upper threads 14 and lower threads 16 on each end of the nipple 12. A dielectric liner 18 is located on the inner surface of the nipple 12. Upper thread 14 connects to plumbing (not shown) while lower thread 16 connects to a coupling 20 of the water heater. A dip tube cup or retaining cup 22 is located near the bottom of the coupling 20. A gasket 24 is located below the nipple 12 and around an upper portion of the dip tube 10 and rests upon the dip tube cup to retain the dip tube in position. Separate heat trap assemblies 26 are respectively installed within the nipple 12 near the upper threads 14 and the lower threads 16. A leak point exists at the connection of the dip tube 10 and the nipple 12. If either of the gasket 24 or the dip tube cup is installed improperly, the dip tube 10 may not seat properly in the water heater. If not seated properly, a gap is created between the dip tube 10 and the nipple 12 which can leak water. Additionally, if the nipple 12 is not threaded completely into the coupling 20, a gap will exist between the dip tube 10 and the nipple 12 which can also leak water. Any water leaks in this area of the water heater may cause cold water to mix with the hot water at the top of the water heater which reduces the efficiency of the water heater. Also, water leaks may cause corrosion of parts in the water heater not meant to be exposed to water.

Figure 14:
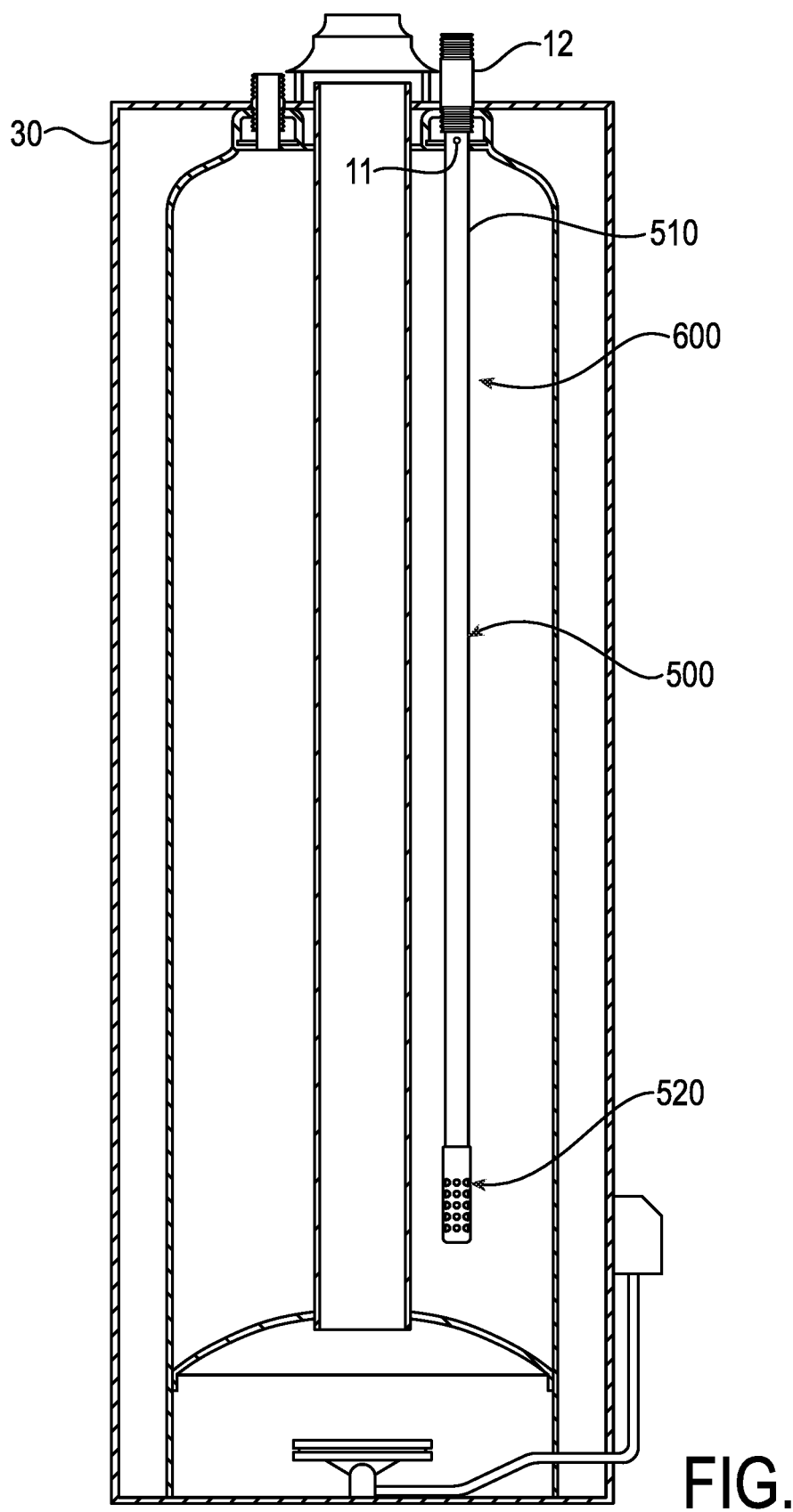
FIG. 14 is a partial cross section view of a water heater including a dip tube according to an embodiment of the present invention.

FIG. 14 shows a water heater 30 with a dip tube 600 installed therein according to an embodiment of the present invention. The water heater 30 is shown in a partial cross section view to display the dip tube 600. The dip tube 600 comprises a pipe nipple insert 100, 200, 300, 400 and a tubular body 500 as discussed further herein. The tubular body 500 may further include a dispersion tip 520 at the bottom of the tubular body to disperse the incoming water into the water heater as shown in FIG. 14. The nipple 12 is free of any dielectric liner and the pipe nipple insert 100, 200, 300, 400 is free of a dip tube cup or retaining cup and a gasket.

Figure 2:
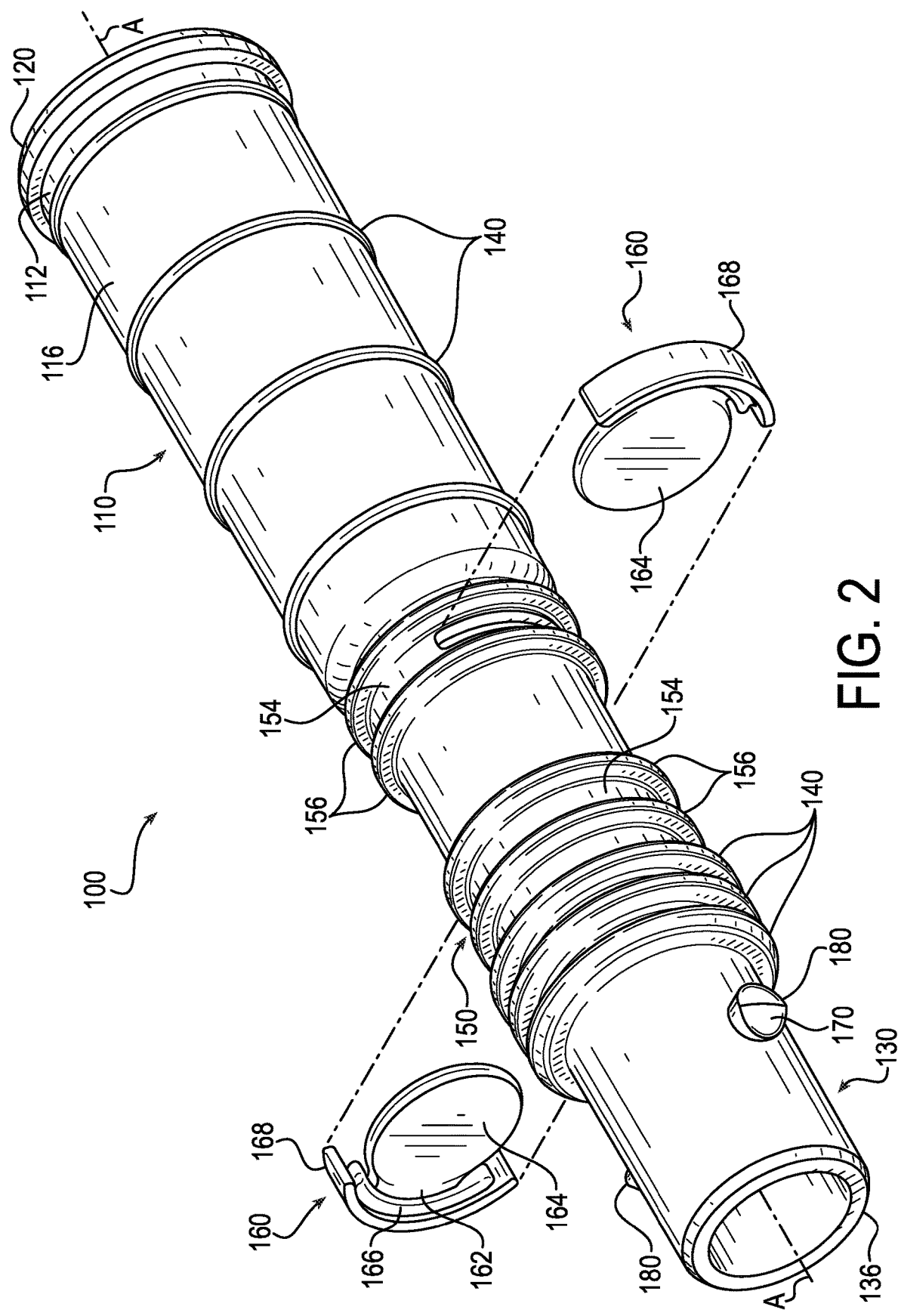
FIG. 2 is a perspective view of a pipe nipple insert in accordance with an example of the disclosure.

Referring now to FIG. 2, a pipe nipple insert 100 according to one embodiment of the present invention is shown. FIG. 2 displays a perspective view of the pipe nipple insert 100. The pipe nipple insert 100 includes a pipe nipple section 110, a tubular body section 130, a top end 112 and a bottom end 136. The pipe nipple section 110 is located above the tubular body section 130. The pipe nipple section 110 is generally cylindrical so as to be inserted and fit within the nipple 12 and includes a longitudinal axis A. However, the pipe nipple section 110 may be any shape that allows it to be inserted into and fit within the nipple 12. The tubular body section 130 is also generally cylindrical but may also be any shape that allows it to be inserted through the nipple 12 and fit within an upper end 510 of a tubular body 500.

Figure 3:
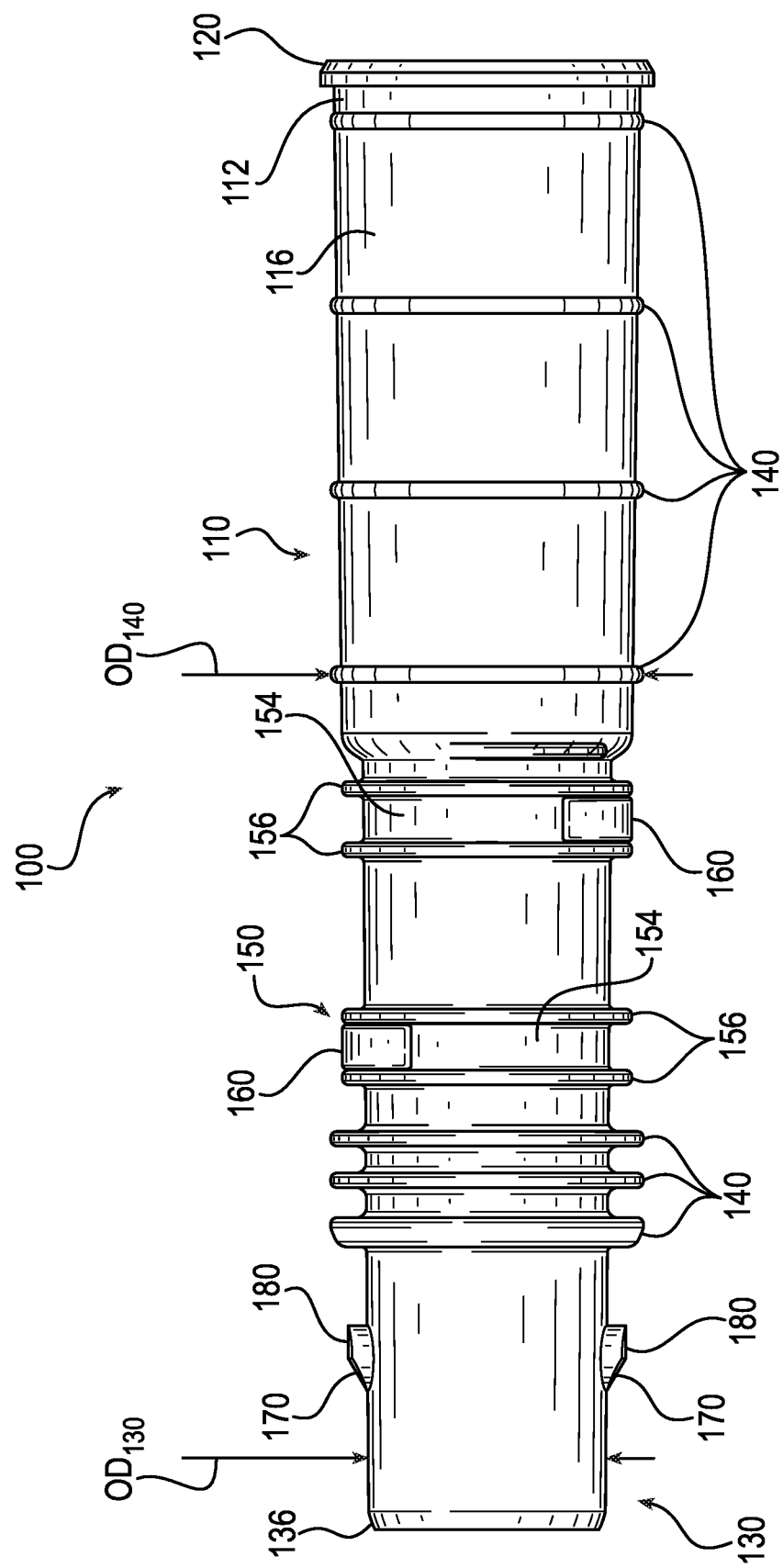
FIG. 3 is front view of the pipe nipple insert of FIG. 2.

With further reference to FIGS. 2 and 3, the pipe nipple insert 100 includes a flange 120 located at the top end 112. The flange 120 extends outwardly from an outer wall 116 and around the entire circumference of the top end 112. In an alternative embodiment the flange 120 may extend only partially around the circumference of the top end 112. In other words, the flange 120 may either be a solid radial flange or one with gaps. The flange with gaps may allow for more efficient molding. The flange 120 retains the pipe nipple insert 100 in the nipple 12 and helps prevent the pipe nipple insert 100 from falling into the nipple 12 when installed in the water heater.

The pipe nipple insert 100 may also be press fit into the nipple 12. In one example, a plurality of annular crush rings 140 help to retain the pipe nipple insert 100 within the nipple 12, in addition to being retained at the top of the nipple 12 by the flange 120. Additionally, the plurality of annular crush rings 140 also effectuate a leak free seal between the nipple 12 and the pipe nipple insert 100. The plurality of annular crush rings 140 extend radially from the outer wall 116 and are substantially perpendicular to the longitudinal axis A of the pipe nipple insert 100. Each of the plurality of annular crush rings 140 has an outside diameter $OD_{140}$ greater than or equal to the inside diameter $ID_{12}$ of the nipple 12 which creates the press fit when installed in the nipple 12. The last annular crush ring 140 may be tapered to allow for easier insertion into the pipe nipple 12 as seen in FIGS. 2-3.

Figure 4:
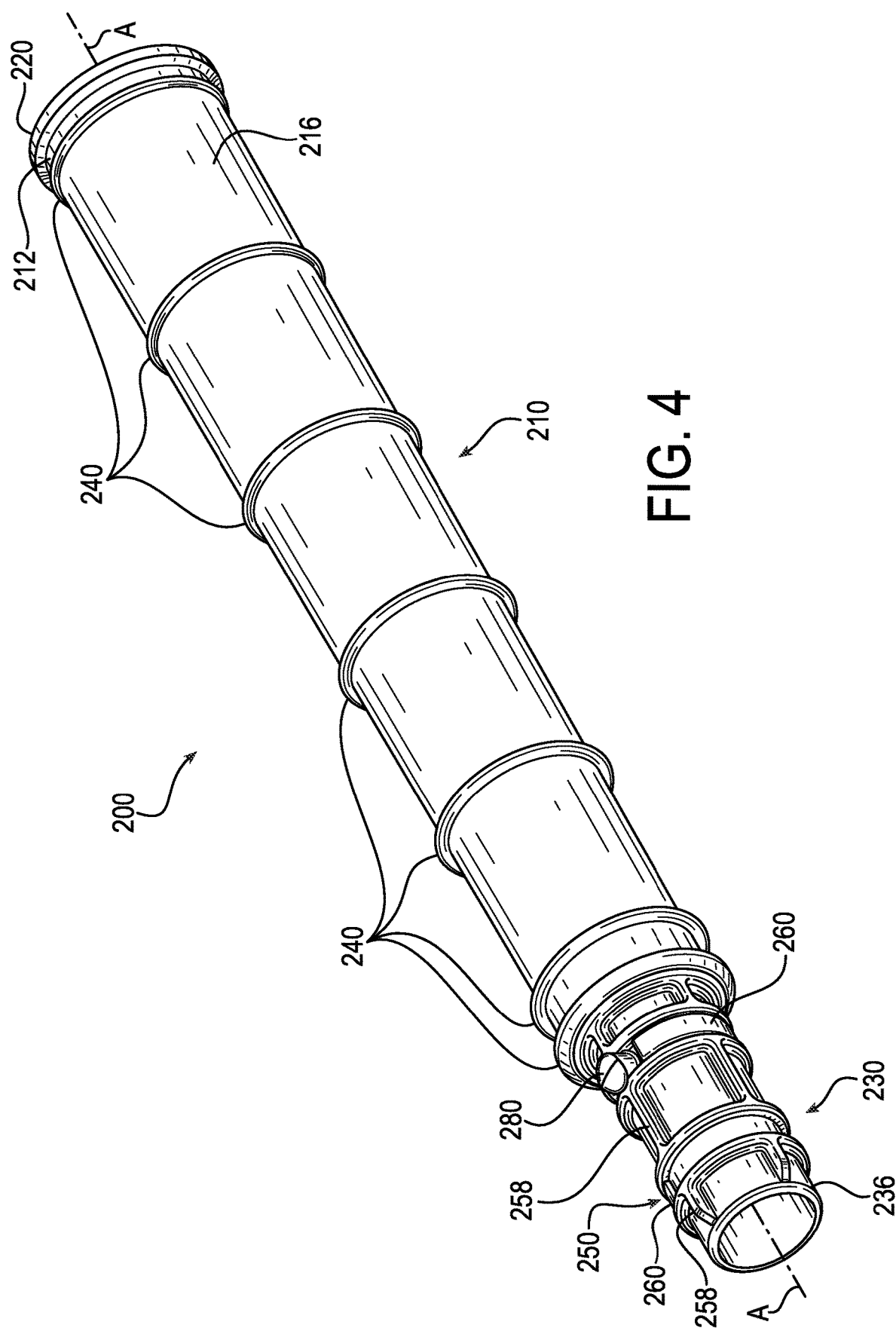
FIG. 4 is a perspective view of a pipe nipple insert in accordance with an example of the disclosure.

As shown in FIGS. 2 and 3, the pipe nipple section 110 of the pipe nipple insert 100 includes a heat trap assembly 150 for reducing heat loss by thermal convection flow of heated water from the water heater through its cold water inlet. The heat trap assembly 150 is located between annular crush rings 140 as shown, and the tubular body section 130 is located below the last annular crush ring 140. The heat trap assembly 150 includes heat traps 160 which attach to the heat trap assembly 150. As shown in FIG. 4, each heat trap 160 includes an inner portion 164, a connecting portion 162, a slot-engaging portion 166, and an outer ring portion 168. The connecting portion 162 connects the inner portion 164 to the slot-engaging portion 166. The inner portion 164 is substantially circular and has a diameter $D_{164}$ that is substantially the same as an inner diameter $ID_{110}$ of the pipe nipple section 110. Partial circumferential slots 152 are formed in the outer wall 116 of the pipe nipple section 110 to allow for insertion of the inner portion 164 of the heat trap 160. Annular grooves 154 are included in the outer wall 116 of the pipe nipple section 110 between retaining rings 156 to accommodate the outer ring portion 168 of the heat traps 160. Specifically, each annular groove 154 is located between a pair of retaining rings 156 as shown in FIGS. 2-3, where the retaining rings 156 prevent the outer ring portion 168 of the heat trap 160 from being removed and/or damaged from the installed position during insertion of pipe nipple insert 100 into the pipe nipple 12. The partial circumferential slots 152 also provide a means for maintaining the heat trap 160 in place by interfacing with the slot-engaging portion 166 of the heat trap 160. The heat trap 160 is further held in place by the relationship with the inner wall of the nipple 12, where the outer ring portion 168 abuts against the inner wall of the nipple 12 in the installed position.

The heat traps 160 may be made out of elastomeric material, such as rubber that allow the inner portion 164 to be deformed and inserted through the partial circumferential slot 152, where the inner portion 164 expands or returns to its original shape when installed inside the pipe nipple insert 100. The elastic material may also allow the slot-engaging portion 166 to interface and be retained within the partial circumferential slot 152.

With further reference to FIGS. 2 and 3, the tubular body section 130 is located below the last annular crush ring 140. The tubular body section 130 provides for the tubular body 500 to be attached to the pipe nipple insert 100. The tubular body 500 may be mechanically attached to tubular body section 130 of the pipe nipple insert 100. In one example, the mechanical attachment is a pair of tab locks 180, although any known mechanical fastener or attachment means may be used. The tab lock 180 may further include a taper 170 to allow for the tubular body 500 to more easily engage the tubular body section 130 of the pipe nipple insert 100. The tubular body 500 includes corresponding holes 11 to accommodate the tab locks 180, as shown by way of example in FIG. 6. The tubular body 500 has an inner diameter $ID_{10}$ greater than or equal to the outer diameter $OD_{130}$ of the tubular body section 130, where an upper end 510 of the tubular body 500 is slid over the tubular body section 130 until interfacing with the tab locks 180 which secure the tubular body 500 in place. In this secured position, the upper end 510 of the tubular body 500 overlaps the bottom end 136 of the pipe nipple insert 100, securing the tubular body in place in an overlapping engagement with the bottom end 136 of the pipe nipple insert 100. The bottom end 136 may be slightly tapered to allow for easier insertion into the upper end 510 of the tubular body 500.

Figure 5:
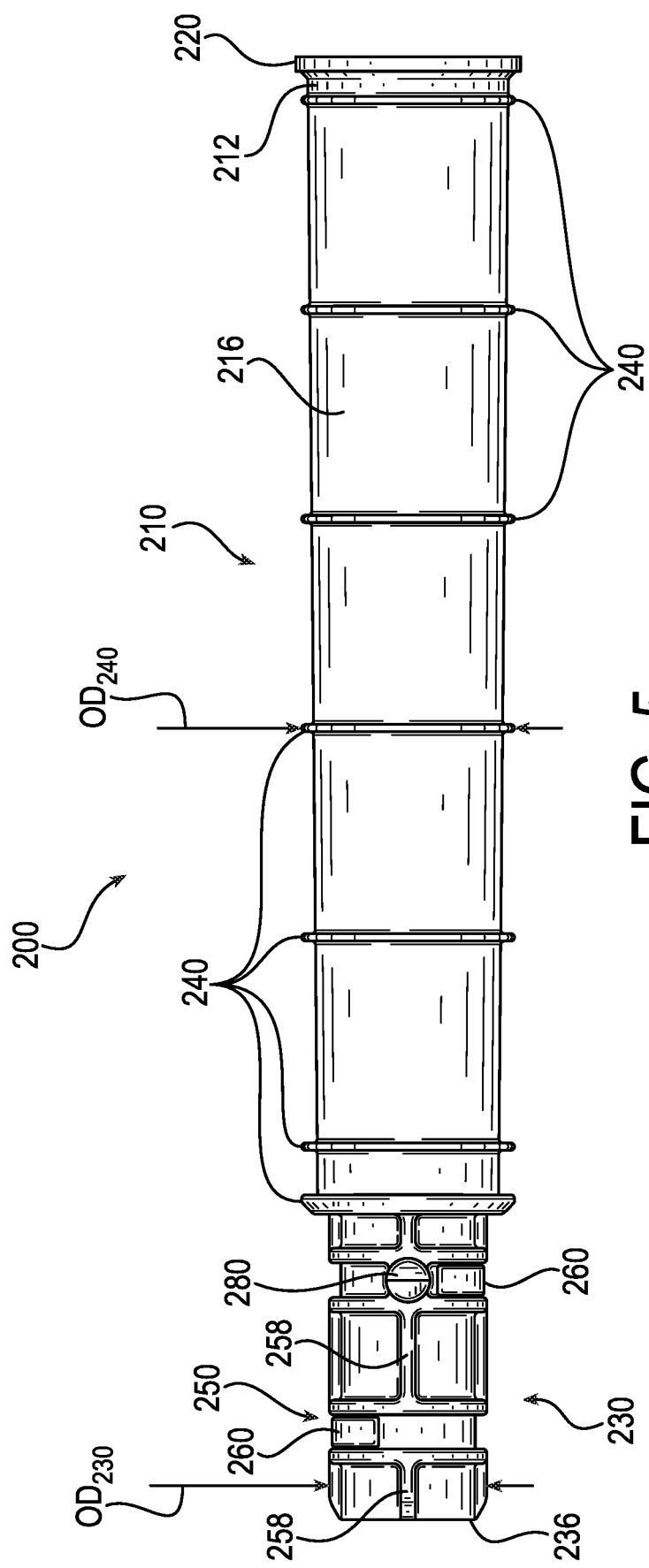
FIG. 5 is front view of the pipe nipple insert of FIG. 4.
Figure 6:
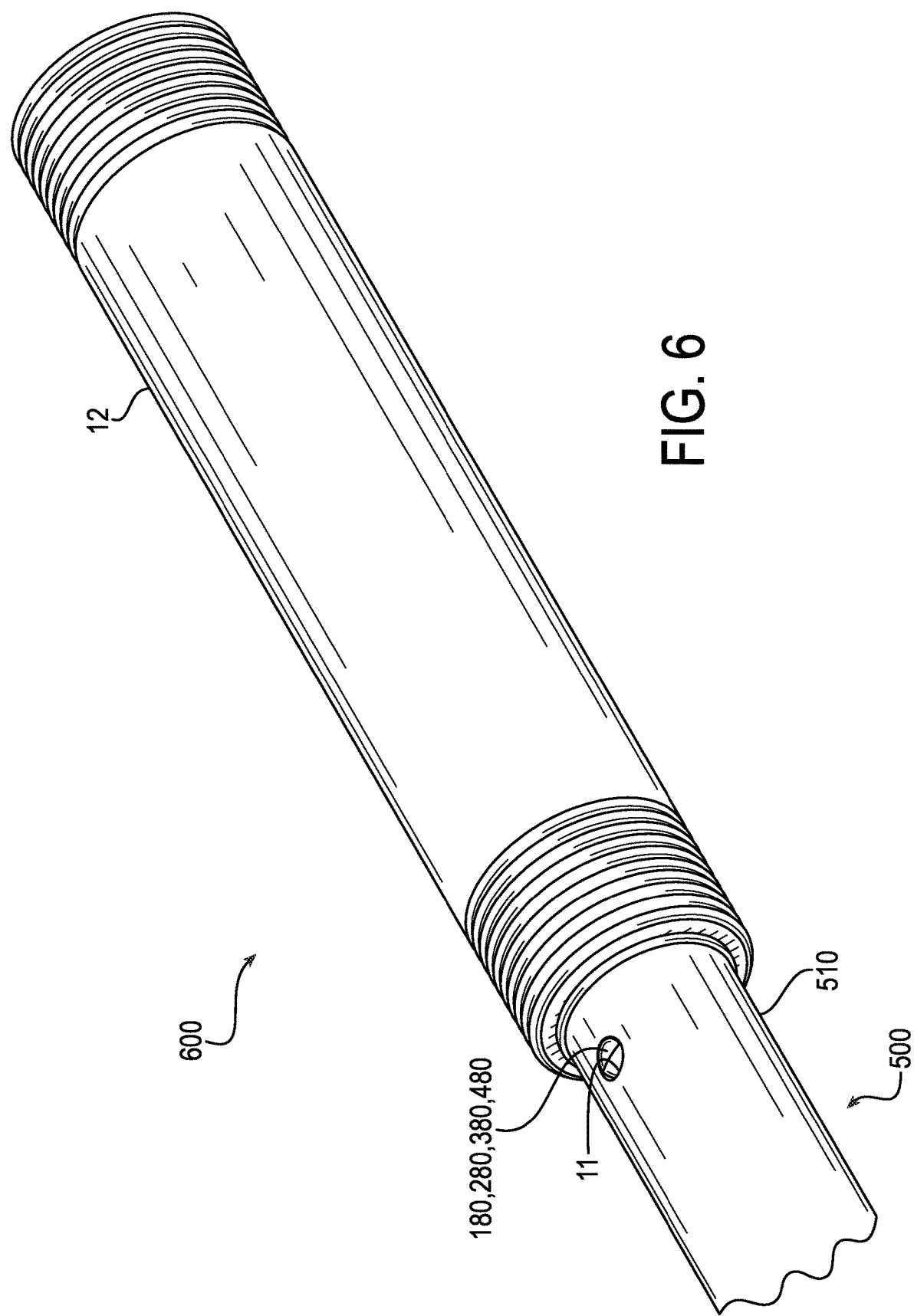
FIG. 6 is a partial perspective view of a dip tube installed in a pipe nipple in accordance with an example of the disclosure.
Figure 7:
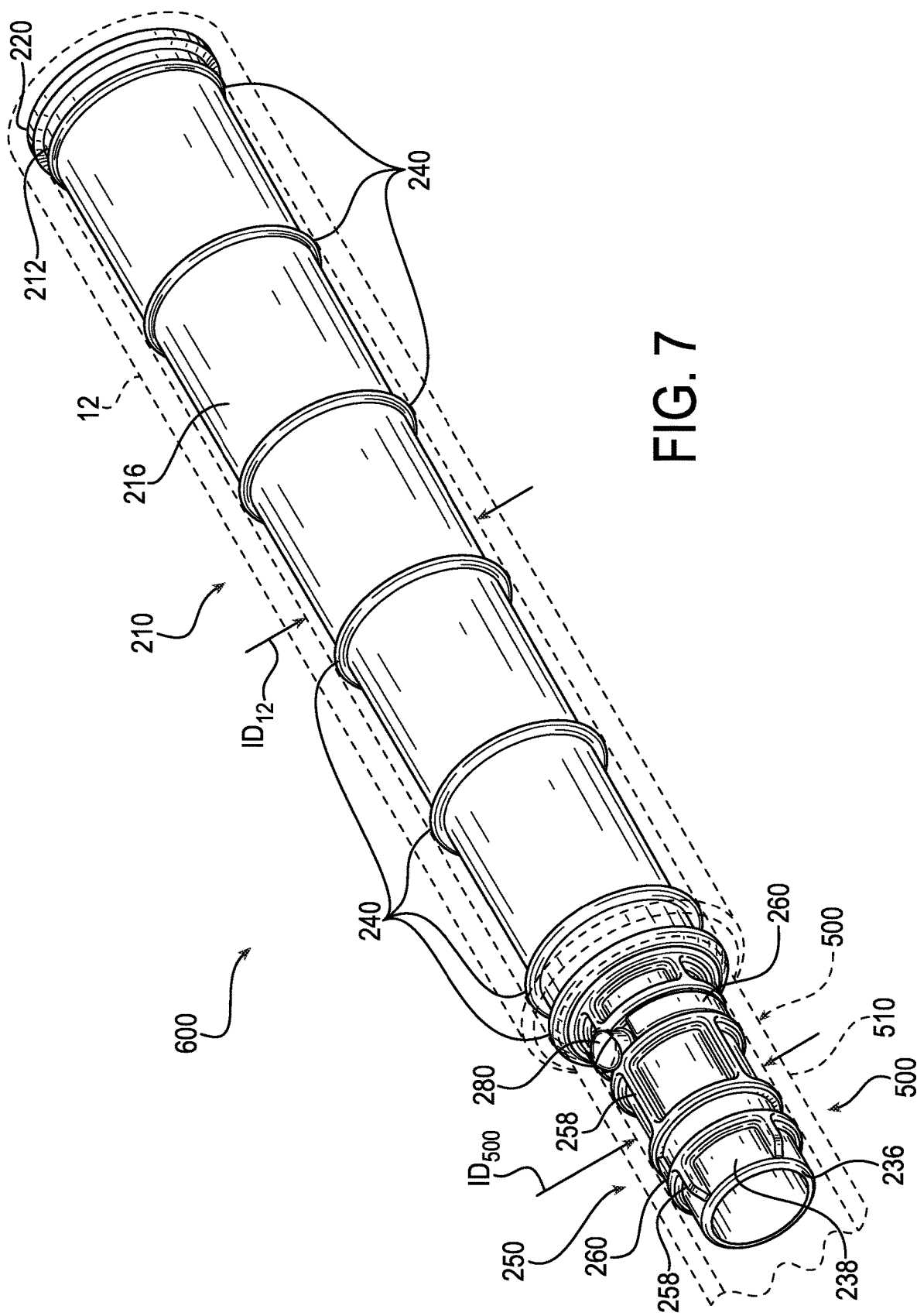
FIG. 7 is a partial perspective view of a pipe nipple insert installed in a transparent pipe nipple and a transparent dip tube attached in accordance with an example of the disclosure.
Figure 8:
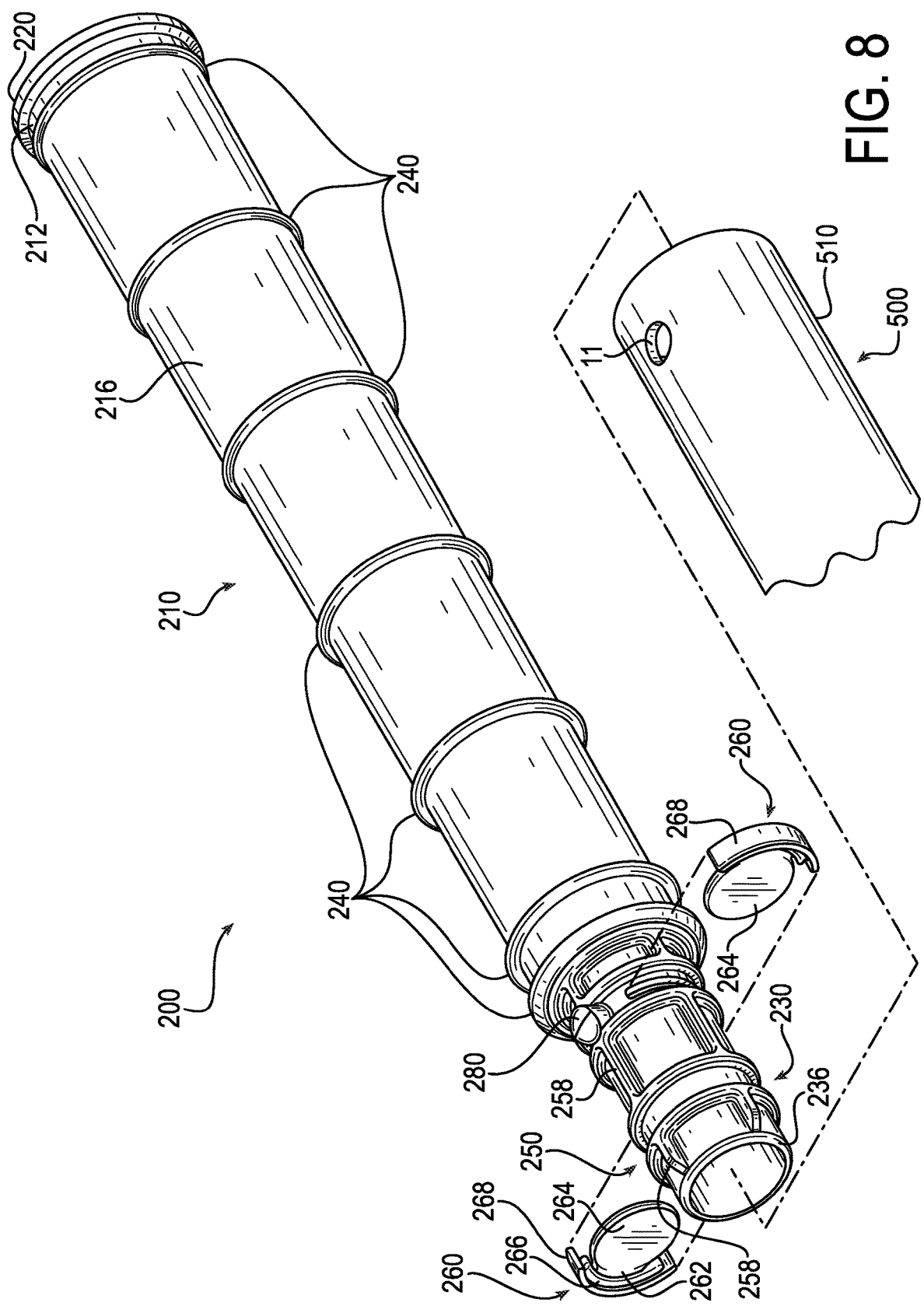
FIG. 8 is a partial exploded view of a pipe nipple insert and a tubular body in accordance with an example of the disclosure.
Figure 9:
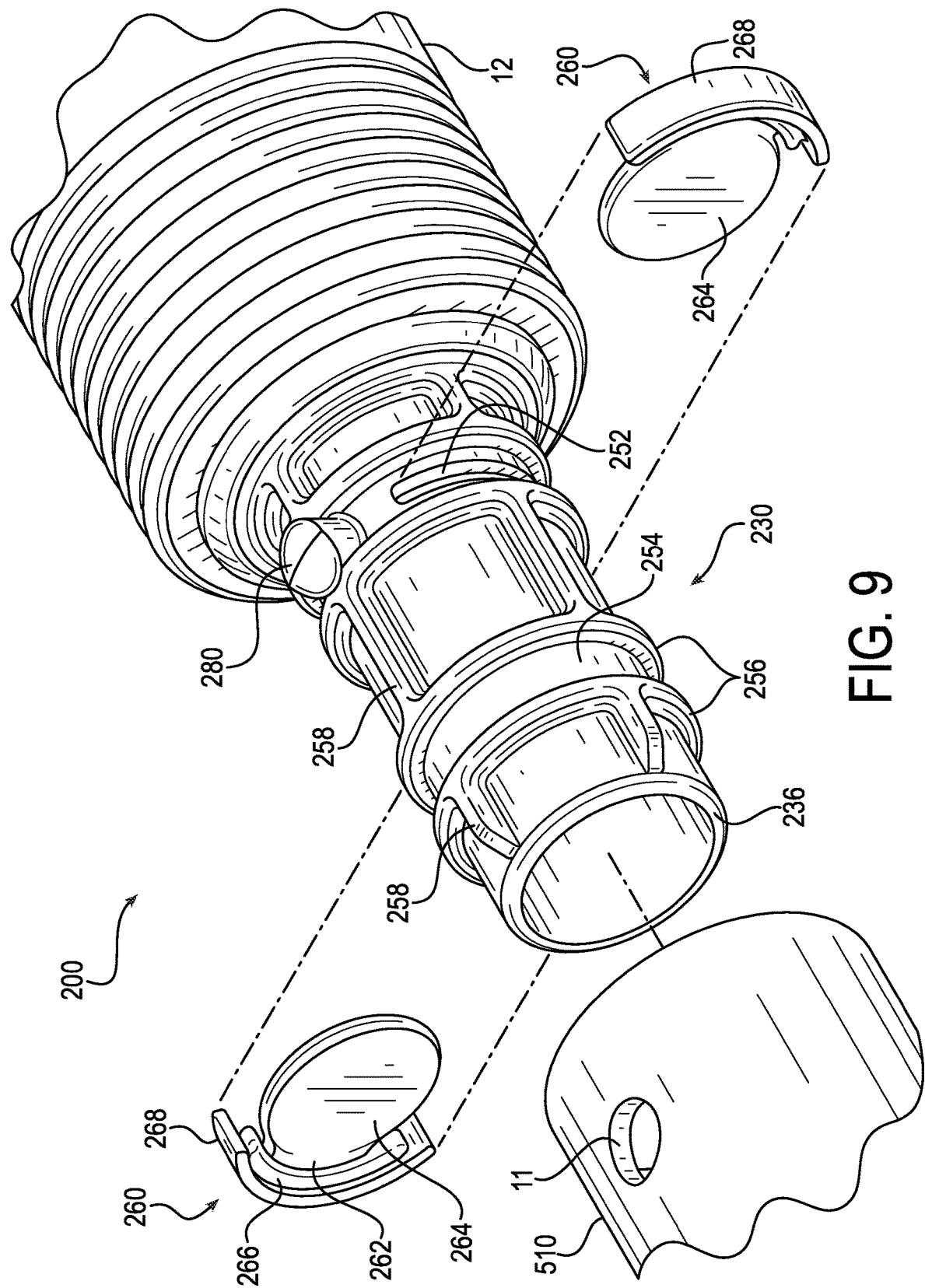
FIG. 9 is an enlarged partial view of FIG. 8.

Another embodiment of a pipe nipple insert 200 is shown in FIGS. 4-9. FIG. 4 displays a perspective view of the pipe nipple insert 200 while FIG. 5 shows a front view. FIG. 6 displays a dip tube 600 installed in the pipe nipple 12, where the pipe nipple insert is hidden from view except for the tab 280, with the tubular body 500 attached. FIG. 7 is similar to FIG. 6, but shows the pipe nipple 12 and the tubular body 500 as transparent using hidden lines in order to better see the pipe nipple insert 200 in the installed position. FIG. 8 is an exploded view showing the pipe nipple insert 200 installed in the nipple 12 and the tubular body 500 not yet connected to the pipe nipple insert 200. FIG. 9 is an enlarged view of FIG. 8.

The pipe nipple insert 200 includes a pipe nipple section 210, a tubular body section 230, a top end 212 and a bottom end 236. The pipe nipple section 210 is located above the tubular body section 230. The pipe nipple section 210 is generally cylindrical so as to be inserted and fit within the nipple 12. However, the pipe nipple section 210 may be any shape that allows it to be inserted into and fit within the nipple 12. The tubular body section 230 is also generally cylindrical but may be any shape that allows it to be inserted through and fitted in the nipple 12.

The pipe nipple insert 200 includes a flange 220 located at the top end 212. The flange 220 extends outwardly from an outer wall 216 and around the entire circumference of the top end 212. In an alternative embodiment the flange 220 may extend only partially around the circumference of the top end 212. In other words, the flange 220 may either be a solid radial flange or one with gaps. The flange with gaps may allow for more efficient molding. The flange 220 retains the pipe nipple insert 200 in the nipple 12 and helps prevent the pipe nipple insert from falling into the nipple 12 when installed in the water heater.

The pipe nipple insert 200 may also be press fit into the nipple 12. In one example, a plurality of annular crush rings 240 help to retain the pipe nipple insert 200 within the nipple 12, in addition to being retained at the top of the nipple 12 by the flange 220. Additionally, the plurality of annular crush rings 240 also effectuate a leak free seal between the nipple 12 and the pipe nipple insert 200. The plurality of annular crush rings 240 extend radially from the outer wall 216 and are substantially perpendicular to the longitudinal axis A of the pipe nipple insert 200. Each of the plurality of annular crush rings 240 has an outside diameter $OD_{240}$ greater than or equal to the inside diameter $ID_{12}$ of the nipple 12 which creates the press fit when installed in the nipple 12.

As shown in FIGS. 4-5 and 7-9, the tubular body section 230 of the pipe nipple insert 200 includes a heat trap assembly 250 for reducing heat loss by thermal convection flow of heated water from the water heater through its cold water inlet. The heat trap assembly 250 is located near the bottom end 236 of the pipe nipple insert 200. As seen in FIG. 7, the upper end 510 of the tubular body 500 is installed over the heat trap assembly 250, and the pipe nipple 12 is located above the heat trap assembly 250. The heat trap assembly 250 includes heat traps 260 which attach to the heat trap assembly 250. As shown in FIGS. 8-9, each heat trap 260 includes an inner portion 264, a connecting portion 262, a slot-engaging portion 266, and an outer ring portion 268. The connecting portion 262 connects the inner portion 264 to the slot-engaging portion 266. The inner portion 264 is substantially circular and has a diameter $D_{264}$ that is substantially the same as an inner diameter $ID_{230}$ of the tubular body section 230. Partial circumferential slots 252 are formed in the outer wall 216 of the tubular body section 230 to allow for insertion of the inner portion 264 of the heat trap 260. Annular grooves 254 are included in the outer wall 216 of the tubular body section 230 to accommodate the outer ring portion 268 of the heat traps 260. The partial circumferential slots 252 also provide a means for maintaining the heat trap 260 in place by interfacing with the slot-engaging portion 266 of the heat trap 260. The heat trap 260 is further held in place by the relationship by the inner wall of the tubular body 500, where the outer ring portion 268 abuts against the inner wall of the tubular body 500 in the installed position.

In order to strengthen the heat trap assembly 250 and the tubular body section 230, support ribs 258 may extend axially in the direction of the pipe nipple insert axis A and protrude from an outer wall 238 of the tubular body section 230 as shown in FIG. 9. In this example, support ribs 258 are initially tapered adjacent to the bottom end 236 to further allow for easier insertion into the upper end 510 of the tubular body 500. Support ribs 258 also extend axially between annular grooves 254. Specifically, each annular groove 254 is located between a pair of retaining rings 256 as shown in FIGS. 2-3, where the retaining rings 256 prevent the outer ring portion 268 of the heat trap 260 from being removed and/or damaged from the installed position during insertion of the tubular body section 230 into the upper end 510 of the tubular body 500.

The heat traps 260 may be made out of elastomeric material, such as rubber that allow the inner portion 264 to be deformed and inserted through the partial circumferential slot 252, where the inner portion 264 expands or returns to its original shape when installed inside the pipe nipple insert 200. The elastic material may also allow the slot-engaging portion 266 to interface and be retained within the partial circumferential slot 252.

The tubular body section 230 is located below the last annular crush ring 240. The last annular crush ring 240 may be tapered to allow for easier insertion into the pipe nipple 12 as seen in FIGS. 4-5, for example. The tubular body section 230 provides for the tubular body 500 to be attached to the pipe nipple insert 200. The tubular body 500 may be mechanically attached to tubular body section 230 of the pipe nipple insert 200. In one example, the mechanical attachment is a pair of tab locks 280, although any known mechanical fastener or attachment means may be used. The tab lock 280 may further include a taper 270 to allow for the tubular body 500 to more easily engage the tubular body section 230 of the pipe nipple insert 200. As shown in FIG. 9 for example, the tab lock 280 is positioned in one of the annular grooves 254. The tab lock 280 may further be axially aligned with a support rib or ribs 258 as shown. The tubular body 500 includes corresponding holes 11 to accommodate the tab locks 280, as shown by way of example in FIGS. 6 and 8-9. The tubular body 500 has an inner diameter $ID_{10}$ greater than or equal to the outer diameter $OD_{230}$ of the tubular body section 230, where an upper end 510 of the tubular body 500 is slid over the tubular body section 230 until interfacing with the tab locks 180 which secure the tubular body 500 in place. In this secured position, the upper end 510 of the tubular body 500 overlaps the bottom end 236 of the pipe nipple insert 200, securing the tubular body 500 in place in an overlapping engagement with the bottom end 236 of the pipe nipple insert 100. The bottom end 236 may be slightly tapered to allow for easier insertion into the upper end 510 of the tubular body 500.

Figure 10:
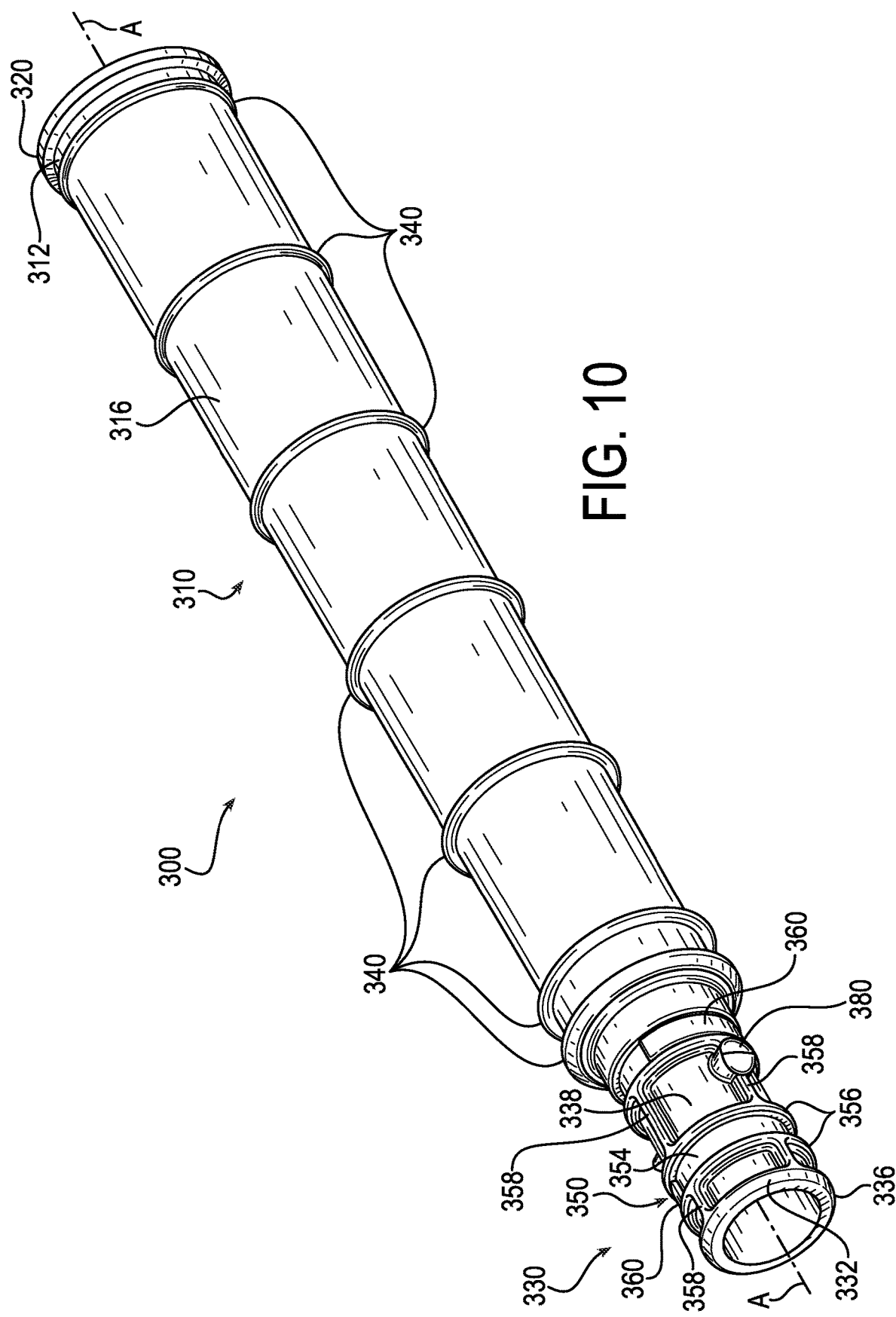
FIG. 10 is a perspective view of a pipe nipple insert in accordance with an example of the disclosure.
Figure 11:
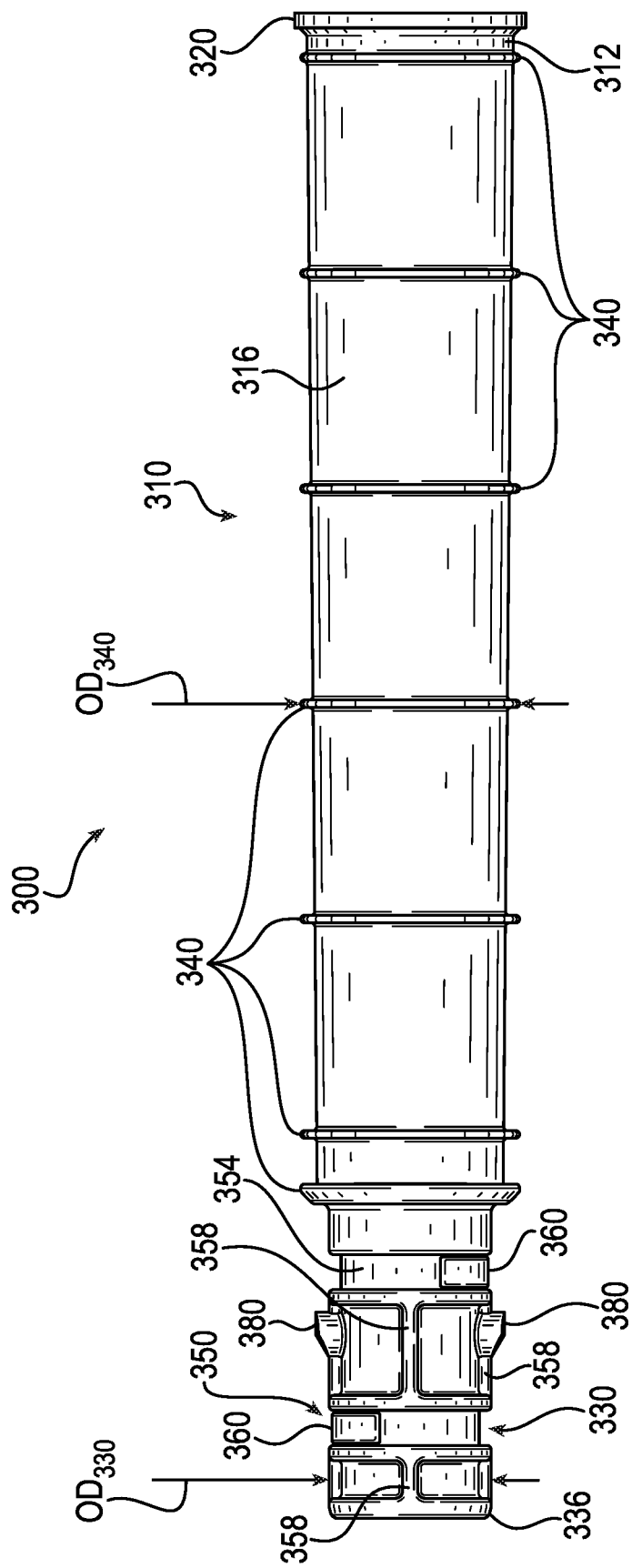
FIG. 11 is front view of the pipe nipple insert of FIG. 10.

FIGS. 10-11 show a further embodiment of a pipe nipple insert 300 according to the present disclosure. The pipe nipple insert 300 includes a pipe nipple section 310, a tubular body section 330, a top end 312 and a bottom end 336. The pipe nipple section 310 is located above the tubular body section 330. The pipe nipple section 310 is generally cylindrical so as to be inserted and fit within the nipple 12. However, the pipe nipple section 310 may be any shape that allows it to be inserted into and fit within the nipple 12. The tubular body section 330 is also generally cylindrical but may be any shape that allows it to be inserted through and fitted in the nipple 12.

The pipe nipple insert 300 includes a flange 320 located at the top end 312. The flange 320 extends outwardly from an outer wall 316 and around the entire circumference of the top end 312. In an alternative embodiment the flange 320 may extend only partially around the circumference of the top end 312. In other words, the flange 320 may either be a solid radial flange or one with gaps. The flange with gaps may allow for more efficient molding. The flange 320 retains the pipe nipple insert 300 in the nipple 12 and helps prevent the pipe nipple insert from falling into the nipple 12 when installed in the water heater.

The pipe nipple insert 300 may also be press fit into the nipple 12. In one example, a plurality of annular crush rings 340 help to retain the pipe nipple insert 300 within the nipple 12, in addition to being retained at the top of the nipple 12 by the flange 320. Additionally, the plurality of annular crush rings 340 also effectuate a leak free seal between the nipple 12 and the pipe nipple insert 300. The plurality of annular crush rings 340 extend radially from the outer wall 316 and are substantially perpendicular to the longitudinal axis A of the pipe nipple insert 300. Each of the plurality of annular crush rings 340 has an outside diameter $OD_{340}$ greater than or equal to the inside diameter $ID_{12}$ of the nipple 12 which creates the press fit when installed in the nipple 12.

The tubular body section 330 of the pipe nipple insert 300 includes a heat trap assembly 350 for reducing heat loss by thermal convection flow of heated water from the water heater through its cold water inlet. The heat trap assembly 350 is located near the bottom end 336 of the pipe nipple insert 300. The upper end 510 of the tubular body 500 is installed over the heat trap assembly 350, and the pipe nipple 12 is located above the heat trap assembly 350, similar to the pipe nipple insert 200 as shown in FIG. 7. The heat trap assembly 350 includes heat traps 360 which attach to the heat trap assembly 350. Each heat trap 360 includes the same features as the heat trap 260 as shown in FIGS. 8-9 including an inner portion 264, a connecting portion 262, a slot-engaging portion 266, and an outer ring portion 268. The connecting portion 262 connects the inner portion 264 to the slot-engaging portion 266. The inner portion 264 is substantially circular and has a diameter $D_{264}$ that is substantially the same as an inner diameter $ID_{330}$ of the tubular body section 330. The heat trap assembly 350 includes partial circumferential slots 252, as previously presented and shown in FIG. 9 for example, which are formed in the outer wall 316 of the tubular body section 330 to allow for insertion of the inner portion 264 of the heat trap 360. Annular grooves 354 are included in the outer wall 316 of the tubular body section 330 to accommodate the outer ring portion 268 of the heat traps 360. The partial circumferential slots 252 also provide a means for maintaining the heat trap 360 in place by interfacing with the slot-engaging portion 266 of the heat trap 360. The heat trap 360 is further held in place by the relationship with the inner wall of the tubular body 500, where the outer ring portion 268 abuts against the inner wall of the tubular body 500 in the installed position.

In order to strengthen the heat trap assembly 350 and the tubular body section 330, support ribs 358 may extend axially in the direction of the pipe nipple insert axis A and protrude from an outer wall 338 of the tubular body section 330 as shown in FIGS. 10-11. In this example, a tapered ring 332 is provided at the bottom end 336 to further allow for easier insertion into the upper end 510 of the tubular body 500. Support ribs 358 also extend axially between annular grooves 354. Specifically, each annular groove 354 is located between a pair of retaining rings 356 as shown in FIGS. 10-11, where the retaining rings 356 prevent the outer ring portion 268 of the heat trap 360 from being removed and/or damaged from the installed position during insertion of the tubular body section 330 into the upper end 510 of the tubular body 500.

The heat traps 360 may be made out of elastomeric material, such as rubber that allow the inner portion 264 to be deformed and inserted through the partial circumferential slot 252, where the inner portion 264 expands or returns to its original shape when installed inside the pipe nipple insert 300. The elastic material may also allow the slot-engaging portion 266 to interface and be retained within the partial circumferential slot 252.

The tubular body section 330 is located below the last annular crush ring 340. The last annular crush ring 340 may be tapered to allow for easier insertion into the pipe nipple 12 as seen in FIGS. 10-11. The tubular body section 330 provides for the tubular body 500 to be attached to the pipe nipple insert 300. The tubular body 500 may be mechanically attached to tubular body section 330 of the pipe nipple insert 200. In one example, the mechanical attachment is a pair of tab locks 380, although any known mechanical fastener or attachment means may be used. The tab lock 380 may further include a taper 370 to allow for the tubular body 500 to more easily engage the tubular body section 330 of the pipe nipple insert 200. As shown in FIGS. 10-11, the tab lock 380 is positioned between a support rib 358 and one of the retaining rings 356. The tab lock 380 may further be axially aligned with a support rib or ribs 358 as shown. The tubular body 500 includes corresponding holes 11 to accommodate the tab locks 380, as shown by way of example in FIGS. 6 and 8-9. The tubular body 500 has an inner diameter $ID_{10}$ greater than or equal to the outer diameter $OD_{330}$ of the tubular body section 330, where an upper end 510 of the tubular body 500 is slid over the tubular body section 330 until interfacing with the tab locks 380 which secure the tubular body 500 in place. In this secured position, the upper end 510 of the tubular body 500 overlaps the bottom end 336 of the pipe nipple insert 300, securing the tubular body 500 in place in an overlapping engagement with the bottom end 336 of the pipe nipple insert 300.

Figure 12:
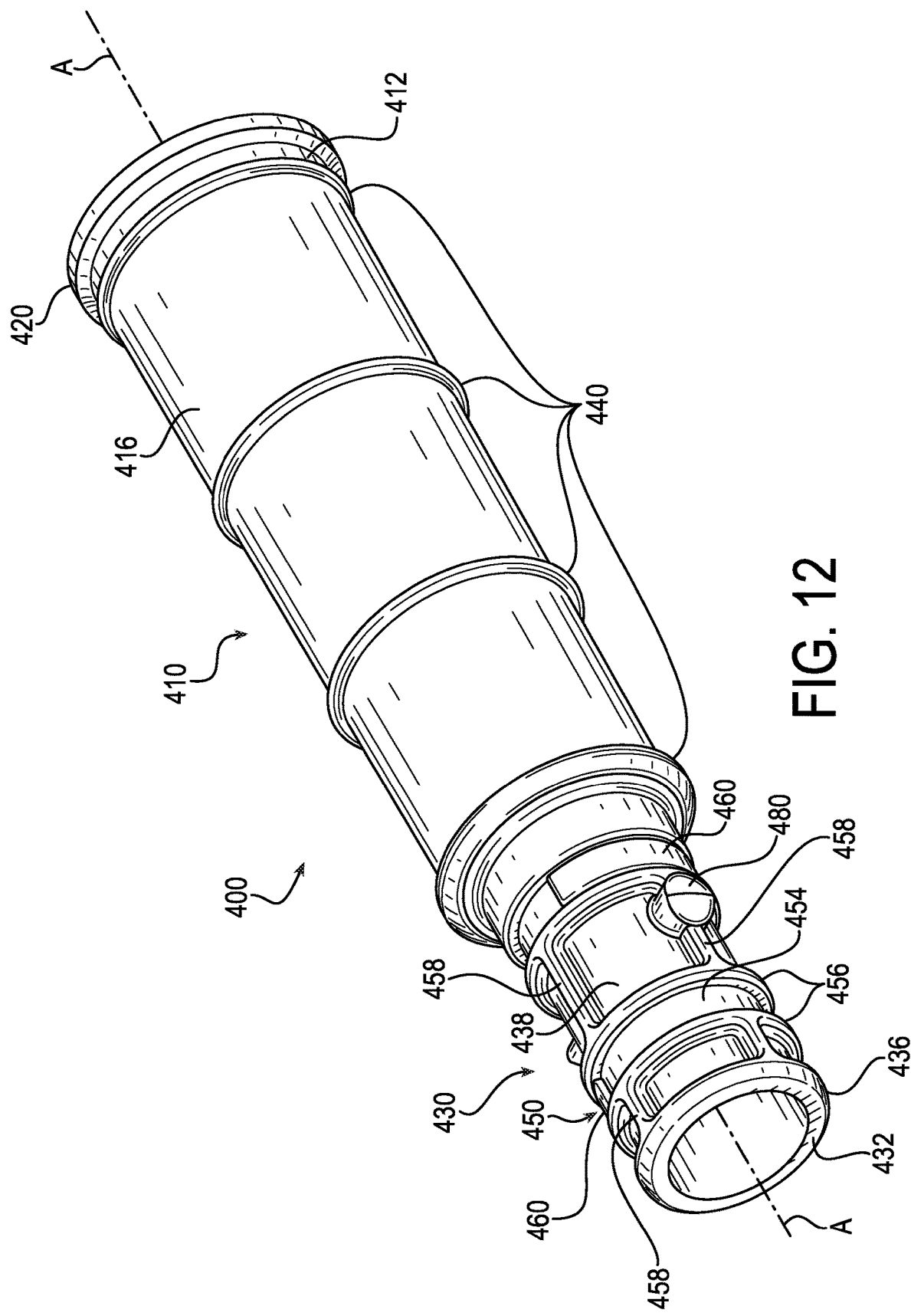
FIG. 12 is a perspective view of a pipe nipple insert in accordance with an example of the disclosure.
Figure 13:
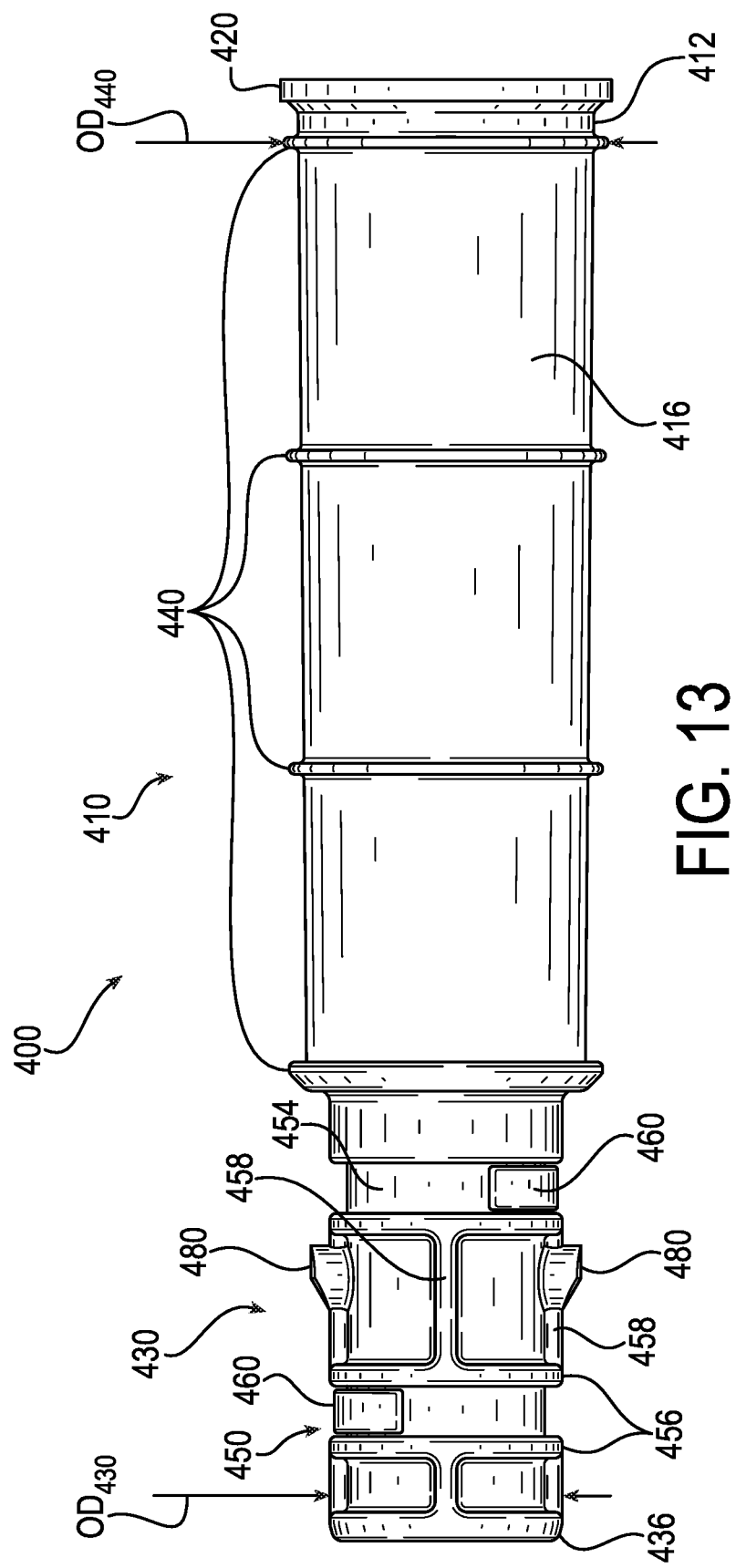
FIG. 13 is front view of the pipe nipple insert of FIG. 12.

FIGS. 12-13 show a further embodiment of a pipe nipple insert 400 according to the present disclosure. The pipe nipple insert 400 includes a pipe nipple section 410, a tubular body section 430, a top end 412 and a bottom end 336. The pipe nipple section 410 is located above the tubular body section 430. The pipe nipple section 410 is generally cylindrical so as to be inserted and fit within the nipple 12. However, the pipe nipple section 410 may be any shape that allows it to be inserted into and fit within the nipple 12. The tubular body section 430 is also generally cylindrical but may be any shape that allows it to be inserted through and fitted in the nipple 12.

The pipe nipple insert 400 includes a flange 420 located at the top end 412. The flange 320 extends outwardly from an outer wall 416 and around the entire circumference of the top end 412. In an alternative embodiment the flange 420 may extend only partially around the circumference of the top end 412. In other words, the flange 420 may either be a solid radial flange or one with gaps. The flange with gaps may allow for more efficient molding. The flange 420 retains the pipe nipple insert 400 in the nipple 12 and helps prevent the pipe nipple insert from falling into the nipple 12 when installed in the water heater.

The pipe nipple insert 400 may also be press fit into the nipple 12. In one example, a plurality of annular crush rings 440 help to retain the pipe nipple insert 400 within the nipple 12, in addition to being retained at the top of the nipple 12 by the flange 420. Additionally, the plurality of annular crush rings 440 also effectuate a leak free seal between the nipple 12 and the pipe nipple insert 300. The plurality of annular crush rings 440 extend radially from the outer wall 416 and are substantially perpendicular to the longitudinal axis A of the pipe nipple insert 400. Each of the plurality of annular crush rings 440 has an outside diameter $OD_{340}$ greater than or equal to the inside diameter $ID_{12}$ of the nipple 12 which creates the press fit when installed in the nipple 12. The pipe nipple insert 400 is shorter in overall length than the prior embodiments, and may be used to accommodate a smaller pipe nipple 12. In this embodiment, the pipe nipple insert 400 includes a shorter pipe nipple section 410 and fewer annular crush rings 440 that prior embodiments recited herein.

The tubular body section 430 of the pipe nipple insert 400 includes a heat trap assembly 450 for reducing heat loss by thermal convection flow of heated water from the water heater through its cold water inlet. The heat trap assembly 450 is located near the bottom end 436 of the pipe nipple insert 400. The upper end 510 of the tubular body 500 is installed over the heat trap assembly 450, and the pipe nipple 12 is located above the heat trap assembly 450, similar to the pipe nipple insert 200 as shown in FIG. 7. The heat trap assembly 450 includes heat traps 460 which attach to the heat trap assembly 450. Each heat trap 460 includes the same features as the heat trap 260 as shown in FIGS. 8-9 an including an inner portion 264, a connecting portion 262, a slot-engaging portion 266, and an outer ring portion 268. The connecting portion 262 connects the inner portion 264 to the slot-engaging portion 266. The inner portion 264 is substantially circular and has a diameter $D_{264}$ that is substantially the same as an inner diameter $ID_{430}$ of the tubular body section 430. The heat trap assembly 450 includes partial circumferential slots 252, as previously presented and shown in FIG. 9 for example, which are formed in the outer wall 416 of the tubular body section 430 to allow for insertion of the inner portion 264 of the heat trap 460. Annular grooves 454 are included in the outer wall 416 of the tubular body section 430 to accommodate the outer ring portion 268 of the heat traps 460. The partial circumferential slots 252 also provide a means for maintaining the heat trap 460 in place by interfacing with the slot-engaging portion 266 of the heat trap 460. The heat trap 460 is further held in place by the relationship by the inner wall of the tubular body 500, where the outer ring portion 268 abuts against the inner wall of the tubular body 500 in the installed position.

In order to strengthen the heat trap assembly 450 and the tubular body section 430, support ribs 458 may extend axially in the direction of the pipe nipple insert axis A and protrude from an outer wall 438 of the tubular body section 430 as shown in FIGS. 12-13. In this example, a tapered ring 432 is provided at the bottom end 436 to further allow for easier insertion into the upper end 510 of the tubular body 500. Support ribs 458 also extend axially between annular grooves 454. Specifically, each annular groove 454 is located between a pair of retaining rings 456 as shown, where the retaining rings 456 prevent the outer ring portion 268 of the heat trap 460 from being removed and/or damaged from the installed position during insertion of the tubular body section 430 into the upper end 510 of the tubular body 500.

The heat traps 460 may be made out of elastomeric material, such as rubber that allow the inner portion 264 to be deformed and inserted through the partial circumferential slot 252, where the inner portion 264 expands or returns to its original shape when installed inside the pipe nipple insert 400. The elastic material may also allow the slot-engaging portion 266 to interface and be retained within the partial circumferential slot 252.

The tubular body section 430 is located below the last annular crush ring 440. The last annular crush ring 440 may be tapered to allow for easier insertion into the pipe nipple 12 as seen in FIGS. 12-13. The tubular body section 430 provides for the tubular body 500 to be attached to the pipe nipple insert 400. The tubular body 500 may be mechanically attached to tubular body section 430 of the pipe nipple insert 400. In one example, the mechanical attachment is a pair of tab locks 480, although any known mechanical fastener or attachment means may be used. The tab lock 480 may further include a taper 470 to allow for the tubular body 500 to more easily engage the tubular body section 430 of the pipe nipple insert 400. As shown in FIGS. 12-13, the tab lock 480 is positioned between a support rib 458 and one of the retaining rings 456. The tab lock 480 may further be axially aligned with a support rib or ribs 458 as shown. The tubular body 500 includes corresponding holes 11 to accommodate the tab locks 480, as shown by way of example in FIGS. 6 and 8-9. The tubular body 500 has an inner diameter $ID_{10}$ greater than or equal to the outer diameter $OD_{430}$ of the tubular body section 430, where an upper end 510 of the tubular body 500 is slid over the tubular body section 430 until interfacing with the tab locks 480 which secure the tubular body 500 in place. In this secured position, the upper end 510 of the tubular body 500 overlaps the bottom end 436 of the pipe nipple insert 400, securing the tubular body 500 in place in an overlapping engagement with the bottom end 436 of the pipe nipple insert 400.

It is also contemplated that the pipe nipple insert 100, 200, 300, 400 may be used with an existing dip tube 10 as shown in FIG. 1, where it would be easy to punch holes 11 in the existing dip tube 10 using a punching process known in the art. In other words, it would be simple to retrofit existing dip tubes 10 for use with the pipe nipple insert 100, 200, 300, 400 disclosed herein. This would also allow for easy replacement of a prior art assembly of a dielectric liner, heat trap assembly, a gasket and a retaining cup without scrapping the already existing dip tube 10.

The pipe nipple insert 100, 200, 300, 400 may be injection molded or formed by other known molding methods. The pipe nipple insert, 100, 200, 300, 400 and tubular body 500 may be made from polyethylene or other known polymers. The pipe nipple insert 100, 200, 300, 400 may be molded from any other material suitable for the environment inside a water heater. The tubular body 500 may be extruded using known extrusion methods.

In one application, the pipe nipple insert 100, 200, 300, 400 and the tubular body 500 are made from high density polyethylene that is crosslinked (PEX). PEX contains crosslinked bonds in the polymer structure changing the thermoplastic into a thermoset. Crosslinking may be accomplished during or after the molding of the part. The required degree of crosslinking for crosslinked polyethylene tubing, according to ASTM Standard F 876-93 is between 65-89%. There are three classifications of PEX, referred to as PEX-A, PEX-B, and PEX-C. PEX-A is made by the peroxide (Engel) method. In this method, peroxides blended with the polymer performs crosslinking above the crystal melting temperature. The polymer is typically kept at an elevated temperature and pressure for long periods of time during the extrusion process to form PEX-A. PEX-B is formed by the silane method, also referred to as the "moisture cure" method. In this method, silane compounds blended with the polymer induces crosslinking during molding and during secondary post-extrusion processes, producing cross-links between a crosslinking agent. The process is accelerated with heat and moisture. The crosslinked bonds are formed through silanol condensation between two grafted vinyltrimethoxysilane units. PEX-C is produced by application of radiation, such as by an electron beam using high energy electrons to split the carbon-hydrogen bonds and facilitate crosslinking.

The pipe nipple insert 100, 200, 300, 400 and the tubular body 500 may be polyethylene or crosslinked polyethylene (PEX) as discussed above, but may also be made from various other polymers as desired for the application. In the practice of this invention, illustrative and non-limiting examples of the polymers that may be used in various combinations to form the pipe nipple insert 100, 200 include: polyacetals, nylons or polyamides, including various types of nylon-6, nylon-6/6, nylon-6/9, nylon-6/10, nylon-6/12, nylon-11, nylon-12, acrylonitrile butadiene styrene terpolymers, polystyrenes, polycarbonates, polyvinyl chlorides and chlorinated polyvinyl chlorides, polyethylene terephthalate polyester, polyethylene homopolymers and copolymers, including all molecular weight and density ranges and degrees of crosslinking, polypropylene homopolymers and copolymers, polybutene resins, poly(meth)acrylics, polyalkylene terephthalates, polyetherimides, polyimides, polyamide-imides, polyacrylates of aromatic polyesters, polyarylether ketones, polyacrylonitrile resins, polyphenylene oxides including polystyrene miscible blends, polyphenylene sulfides, styrene-acrylonitrile copolymers, styrene-butadiene copolymers, styrene maleic anhydride copolymers, polyarylsulfones, polyethersulfones, polysulfones, ethylene acid copolymers, ethylene-vinyl acetate copolymers, ethylene-vinyl alcohol copolymers, thermoplastic elastomers covering a hardness range of from 30 Shore A to 75 Shore D, including styrenic block copolymers, polyolefin blends (TPO), elastomeric alloys, thermoplastic polyurethanes (TPU), thermoplastic copolyesters, and thermoplastic polyamides, polyvinylidene chlorides, allyl thermosets, bismaleimides, epoxy resins, phenolic resins, unsaturated thermoset polyesters, thermoset polyimides, thermoset polyurethanes, and urea and melamine formaldehyde resins. Other polymeric materials may be selected as suitable for a desired application.

In one embodiment, the polymers for the pipe nipple insert 100, 200, 300, 400 and the tubular body 500 may be high density polyethylene, which is subsequently crosslinked, preferably by the application of an electron beam, although other modes of crosslinking are envisioned to be within the scope of this invention. In another embodiment, the polymers for the pipe nipple insert 100, 200, 300, 400 and the tubular body 500 may be glass-filled high density polyethylene, which is subsequently crosslinked by application of an electron beam.

While the invention has been illustrated and described in detail in the drawings and foregoing description, the same is to be considered as illustrative and not restrictive in character, it being understood that only example embodiments have been shown and described and that all changes and modifications that come within the spirit of the invention are desired to be protected by the appended claims and the equivalents thereof.

What is claimed is:

1. A dip tube for use with a water heater, the dip tube comprising:
    a water heater coupling;
    a nipple including threads coupled to the water heater coupling;
    a pipe nipple insert received within the nipple and having a pipe nipple longitudinal axis;
    a tubular body having a tubular longitudinal axis;
    the pipe nipple longitudinal axis being coaxial with the tubular longitudinal axis and the pipe nipple insert being located above the tubular body;
    the pipe nipple insert having an outer wall and including a plurality of annular rings extending radially from the outer wall; and
    an overlapping connection at a bottom of the pipe nipple insert and a top of the tubular body for connecting the bottom of the pipe nipple insert to the top of the tubular body, wherein either the bottom of the pipe nipple insert overlaps the top of the tubular body or the top of the tubular body overlaps the bottom of the pipe nipple insert.

2. The dip tube of claim 1 further comprising a heat trap assembly integral with the pipe nipple insert, the heat trap assembly located below the plurality of annular rings.

3. The dip tube of claim 2 where the heat trap assembly further comprises:
    at least one annular groove located on the outer wall of the pipe nipple insert and having a circumferential slot; and
    at least one heat trap, the at least one heat trap further comprising an inner portion and an outer ring portion, and a connecting portion connecting the outer ring portion to the inner portion;
    where the outer ring portion is located within the at least one annular groove and the inner portion extends through the circumferential slot and is located within the outer wall of the pipe nipple insert.

4. The dip tube of claim 2 where the heat trap assembly further comprises a plurality of support ribs extending axially in the direction of the pipe nipple longitudinal axis.

5. The dip tube of claim 2 where the tubular body overlaps the heat trap assembly.

6. The dip tube of claim 5 where the tubular body retains the at least one heat trap in at least one annular groove.

7. The dip tube of claim 1 further comprising a mechanical attachment including at least one tab lock extending from the outer wall of the pipe nipple insert and a corresponding hole in the tubular body.

8. The dip tube of claim 1, where the plurality of annular rings are substantially perpendicular to the longitudinal axis of the pipe nipple insert.

9. The dip tube of claim 1, where the pipe nipple insert is monolithic.

10. The dip tube of claim 1, where the dip tube is free of a gasket and a retaining cup.

11. The dip tube of claim 1, wherein the pipe nipple insert further includes a flange extending outwardly from an upper end of the outer wall and above the plurality of annular rings, the flange retaining the pipe nipple insert in the nipple by preventing the pipe nipple insert from falling into the nipple.

* * * * *